(12) United States Patent
Cheng

(10) Patent No.: US 7,251,780 B2
(45) Date of Patent: *Jul. 31, 2007

(54) DYNAMIC WEB CONTENT UNFOLDING IN WIRELESS INFORMATION GATEWAYS

(75) Inventor: Lebin Cheng, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/141,409

(22) Filed: Jun. 1, 2005

(65) Prior Publication Data

US 2005/0223084 A1    Oct. 6, 2005

Related U.S. Application Data

(63) Continuation of application No. 09/948,782, filed on Sep. 10, 2001, now Pat. No. 6,941,512.

(51) Int. Cl.
*G06F 13/02* (2006.01)

(52) U.S. Cl. .................. 715/523; 715/513; 715/511; 717/111; 717/115

(58) Field of Classification Search ............. 715/501.1, 715/511, 523, 513; 707/4, 2; 717/111, 115
See application file for complete search history.

(56) References Cited

U.S. PATENT DOCUMENTS 6,647,535 B1 * 11/2003 Bozdagi et al. ............. 715/530
6,757,530 B2 * 6/2004 Rouse et al. ............. 455/412.1

* cited by examiner

Primary Examiner—Stephen Hong
Assistant Examiner—Matthew J. Ludwig

(57) ABSTRACT

A method and apparatus for unfolding dynamic web content in a wireless information gateway for presentation on wireless information devices. The apparatus includes an unfolding engine that converts dynamic web content to static web pages, and a wireless markup language translator module that translates static web content to a format suitable for display by wireless devices. The method includes the steps of intercepting a request for a web page from a wireless device; determining if the requested web page is already stored in an interpreted page cache; fetching the requested web page from an appropriate web server; reading the returned web page in an unfolding engine to detect any dynamic content embedded in the returned web page; unfolding any dynamic content into multiple static content pages by simulation of all possible paths in a dynamic content runtime environment; generating multiple static web pages from the output of the dynamic content runtime environment; storing the multiple static web pages in the interpreted page cache; and delivering to the wireless device one of the stored multiple static web pages appropriate to each action taken on the dynamic content at the requesting wireless device.

8 Claims, 7 Drawing Sheets

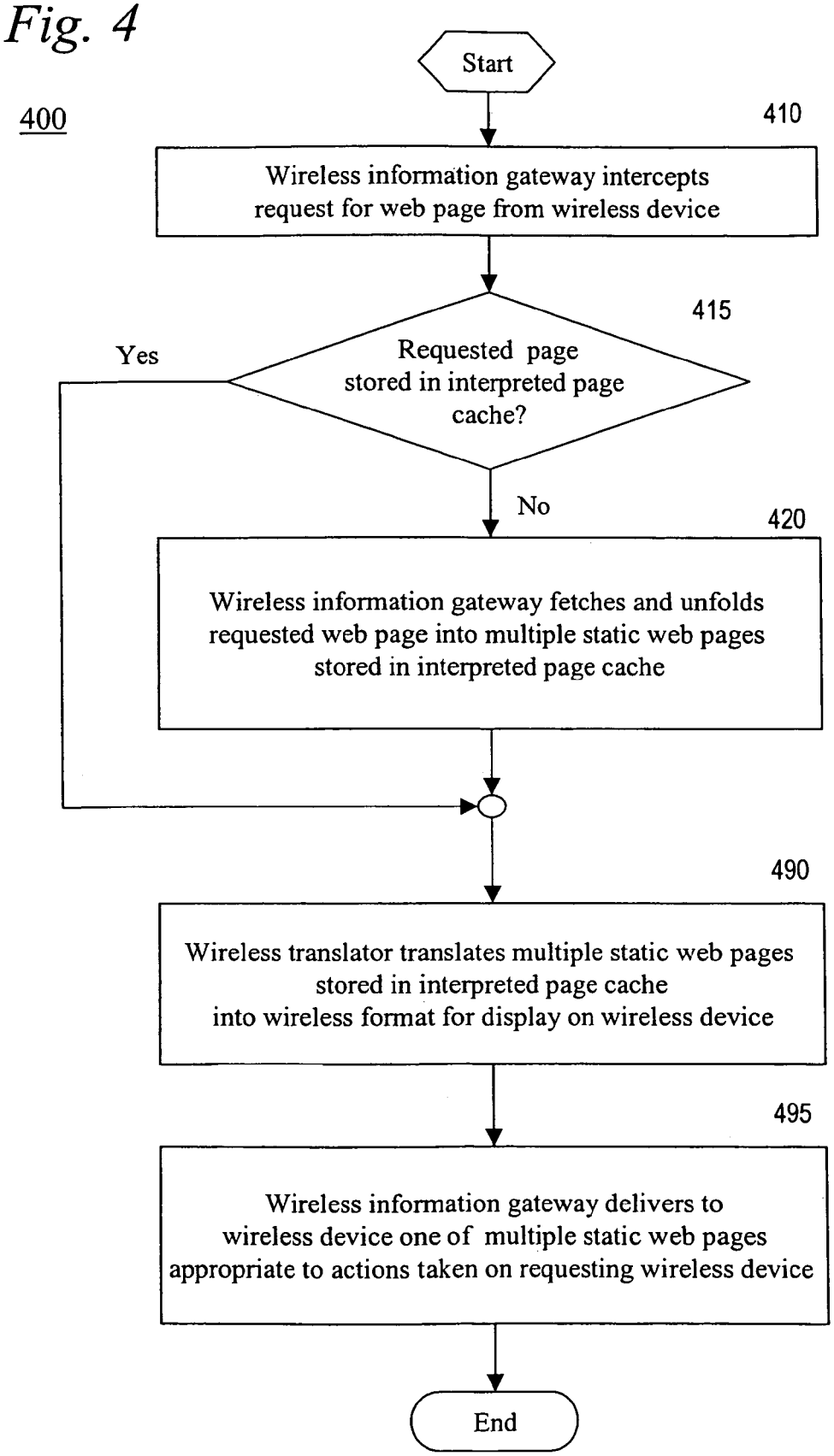

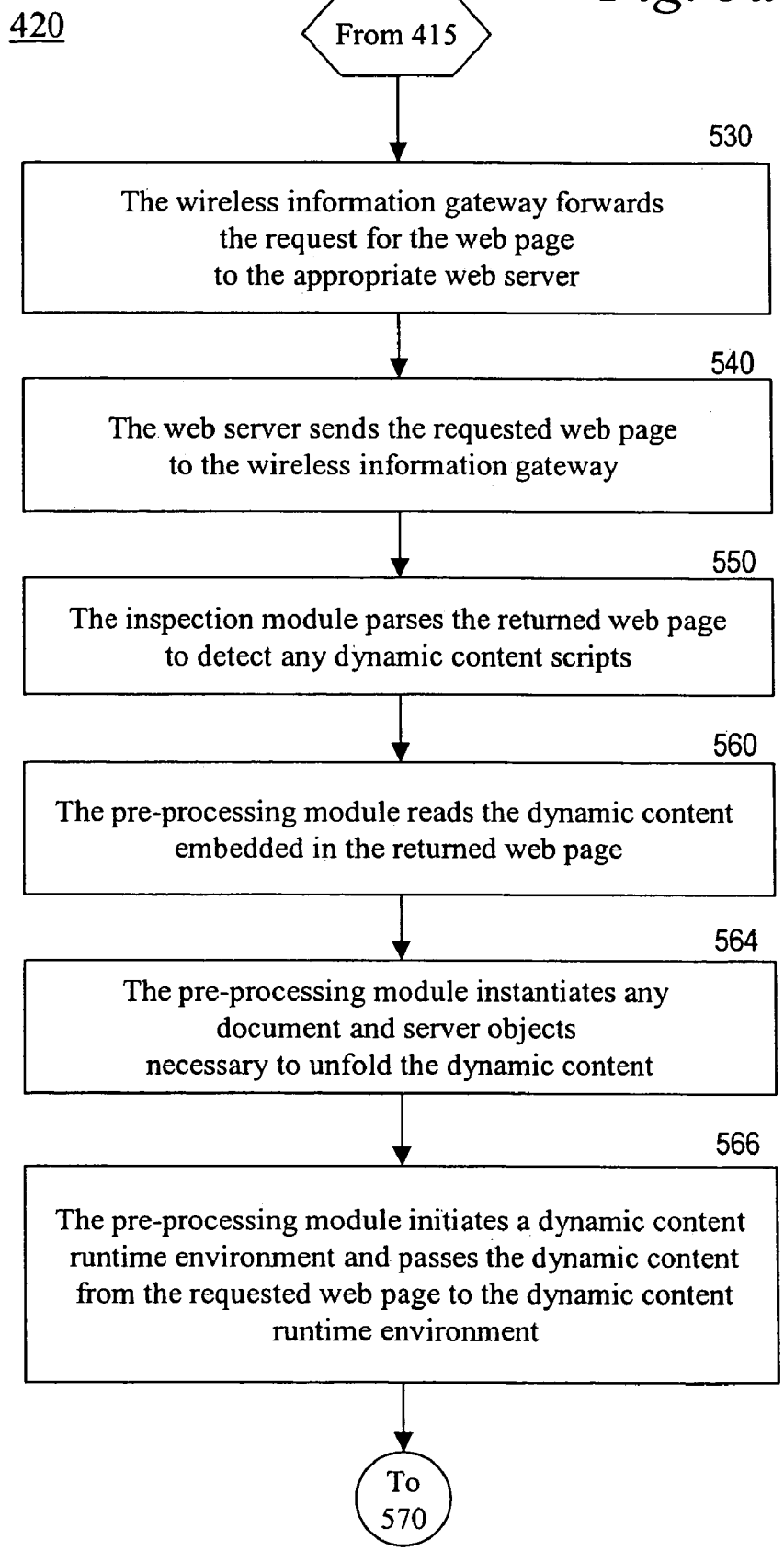

DYNAMIC WEB CONTENT UNFOLDING IN WIRELESS INFORMATION GATEWAYS

CROSS REFERENCE TO RELATED APPLICATION(S)

This is a continuation of application Ser. No. 09/948,782, filed on Sep. 10, 2001 now U.S. Pat. No. 6,941,512, which is hereby incorporated by reference in its entirety herein.

TECHNICAL FIELD

The technical field relates to wireless data presentation, and more specifically to methods and apparatus for delivering dynamic content to wireless information devices.

BACKGROUND

Portable wireless communication and information devices are proliferating rapidly among business and personal users. At the same time, an ever increasing amount and variety of information is becoming available over communications networks such as the Internet, particularly through the Internet's HTTP (Hypertext Transfer Protocol) component, also referred to as the Worldwide Web, or simply the Web. Information on the Web has been encoded primarily in HTML (Hypertext Markup Language) document formatting language, permitting users accessing the information to select highlighted hyperlinks embedded in documents leading to other, related documents. HTML affords users a measure of interactivity with content stored on and accessible through the Web.

The nature of content on the Web has more recently evolved to include more interactivity in the form of what is referred to as dynamic content. Dynamic content takes several forms on the Web, including the use of Dynamic HTML, HTML 4.0, Cascading Style Sheets, JavaScript, VBScript, and XML. The most prevalent, and most widely supported, form of integrated dynamic content is the use interactive scripts, programmed in the JavaScript scripting language, embedded into HTML web pages. JavaScript, as well as the other forms of interactivity mentioned above, allows a web page to be designed such that its content presentation, and the actual content itself, varies depending on the actions taken by the user accessing the content.

However, most wireless devices, such as cell phones and personal digital assistants (PDAs), do not contain the processing power or the necessary complex software to read, interpret and execute the dynamic content contained in many interactive web pages today. The limitations of wireless devices thus limit the experience for the users of such devices attempting to access and utilize content available on the web.

Wireless information gateways have been implemented to act as proxies between wireless devices and the World Wide Web. A typical wireless information gateway fetches web pages from a web site using HTTP and then sends such pages to wireless devices using wireless protocols, including the Wireless Access Protocol (WAP). Wireless devices are generally limited in computing power and display capabilities when compared to other devices used for accessing information on the Worldwide Web. Thus, the wireless devices do not directly handle most web pages encoded in HTML. Instead, the wireless devices must rely on wireless information gateways to perform a translation function that converts HTML web pages to pages encoded in a simplified markup language, such as Wireless Markup Language (WML). The major functions of a wireless information gateway are two-fold: 1) terminate wireless transport protocols while acting as a proxy to fetch web information for wireless devices, and 2) translate web content into simplified formats suitable for display by wireless devices.

Since existing wireless information gateways can only perform static page translations, wireless devices do not now have access to web sites that include dynamic web content.

A need exists to provide a means for delivering dynamic and interactive content to the more limited wireless devices now accessing information on the Internet.

SUMMARY

In one respect, what is described is an apparatus for unfolding dynamic worldwide web content on a wireless information gateway for presentation on wireless devices. The apparatus includes an unfolding engine that converts dynamic web content to static web pages; and a wireless markup language translator module that translates static web content to a format suitable for display by wireless devices.

In another respect, what is described is a method for unfolding dynamic worldwide web content on a wireless information gateway for presentation on wireless devices. The method includes the following steps: intercepting a request for a web page from a wireless device; determining if the requested web page is already stored in an interpreted page cache; fetching the requested web page from an appropriate web server; reading the returned web page in a unfolding engine on the wireless information gateway to detect any dynamic content embedded in the returned web page; unfolding any dynamic content embedded in the returned web page into multiple static content pages by simulation of all possible paths through the dynamic content in a dynamic content runtime environment; generating multiple static web pages from the output of the dynamic content runtime environment; storing the multiple static web pages in the interpreted page cache; and delivering from the interpreted page cache to the wireless device one of the stored multiple static web pages appropriate to each action taken on the dynamic content at the requesting wireless device.

In yet another respect, what is described is a computer-readable medium on which is embedded a program. The embedded program includes instructions for executing the above method.

Those skilled in the art will appreciate these and other advantages and benefits of various embodiments of the invention upon reading the following detailed description of an embodiment with reference to the below-listed drawings.

DESCRIPTION OF THE DRAWINGS

The detailed description will refer to the following drawings, wherein like numerals refer to like elements, and wherein:

FIG. 4 is a flowchart of a method according to one embodiment of a dynamic content unfolding engine in a wireless information gateway; and FIGS. 5a and 5b are more detailed flowcharts of one embodiment of a method for using a dynamic content unfolding engine operating in a wireless information gateway.

DETAILED DESCRIPTION

Figure 1:
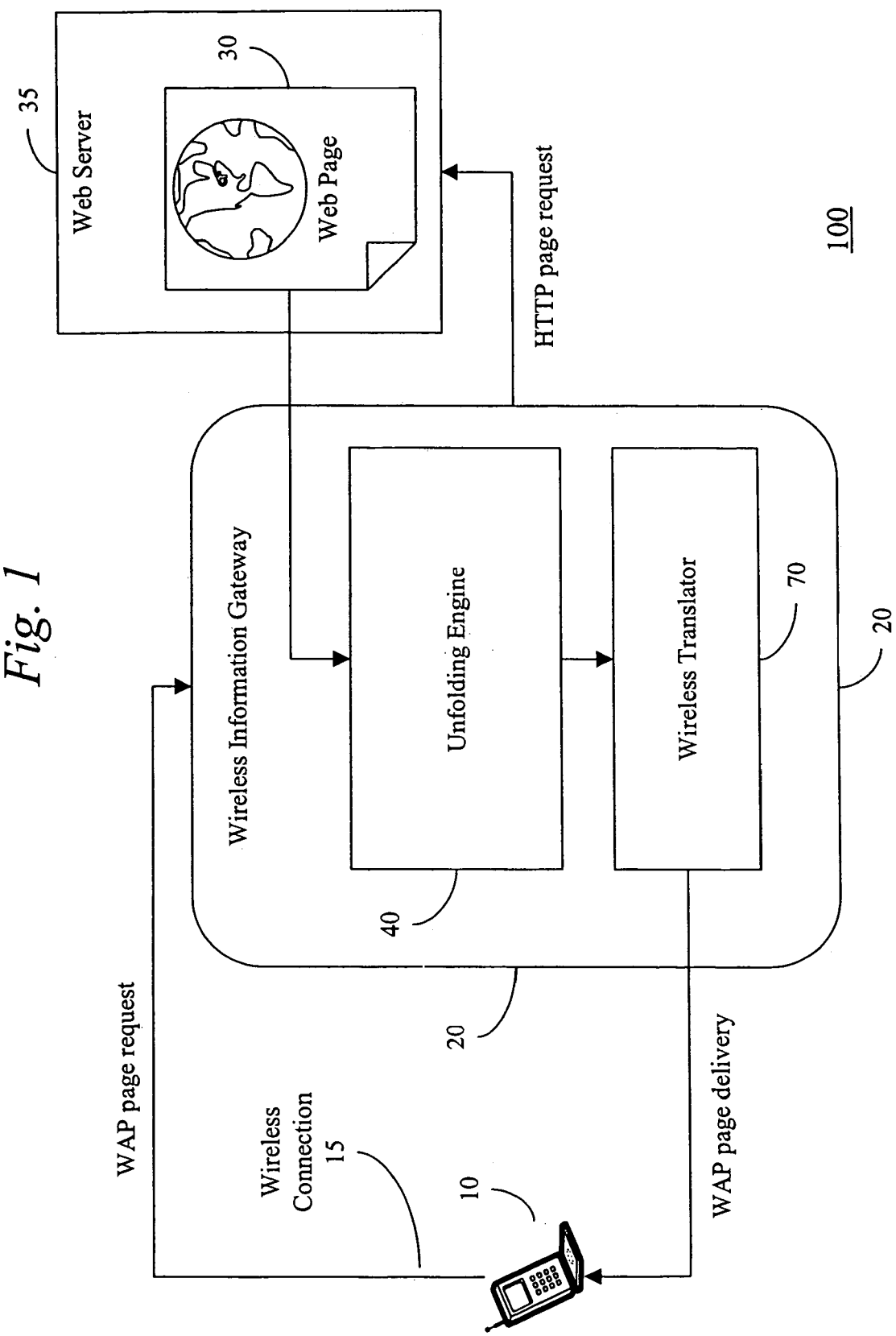
FIG. 1 shows an apparatus according to one embodiment of a dynamic content unfolding engine in a wireless information gateway.

FIG. 1 is a diagram of a system 100 that implements one embodiment of a dynamic content unfolding engine in a wireless information gateway. The system 100 includes a wireless device 10 that enables users to access information over a wireless connection 15 to the Internet or other information network; a wireless information gateway 20 for intercepting and directing communication with the wireless devices 10; and a web page 30, hosted on a web server 35, requested by the wireless device 10. The wireless information gateway 20 is connected by a wireless network connection (not shown) to the wireless device 10 and by a network connection, wired or wireless, to the Internet and thereby to any requested web page 30. The wireless information gateway 20 comprises an unfolding engine 40 for processing web pages 30 requested by wireless devices 10, and a wireless translator 70 for translating web pages encoded in HTML to pages encoded in a wireless format such as WML.

Figure 2A:
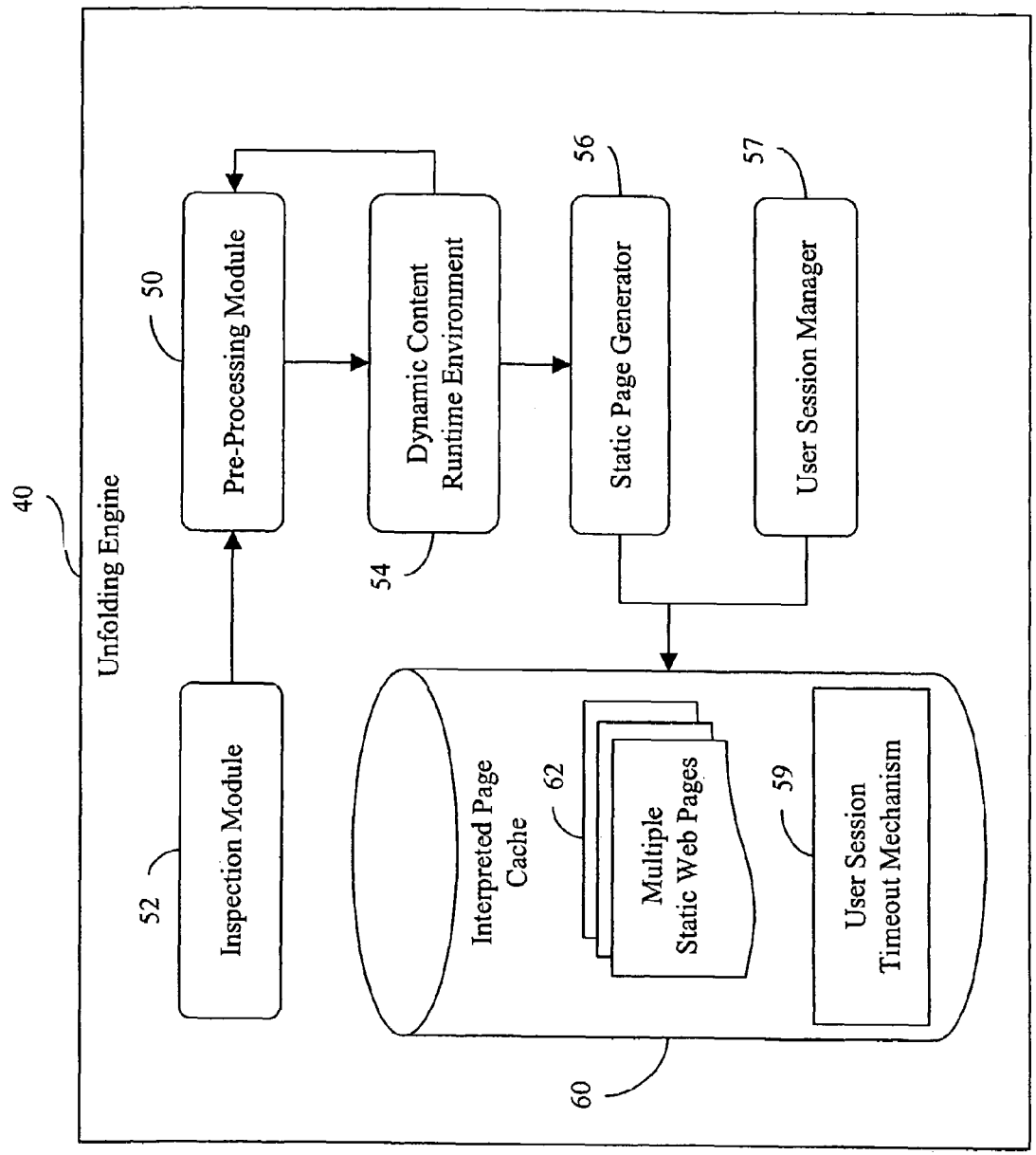
FIG. 2a is a diagram illustrating the dynamic content unfolding engine in more detail.

FIG. 2a is a block diagram of an embodiment of the unfolding engine 40. The unfolding engine 40 comprises an inspection module 52 that reads the requested web page 30 and detects the presence of any dynamic content or scripts embedded in the requested web page 30; a dynamic content runtime environment 54 that simulates the execution of all possible paths through the dynamic content embedded in the requested web page 30; a pre-processing module 50 that instantiates any document or server objects necessary for simulation of the dynamic content within the dynamic content runtime environment 54; a static page generator 56 that combines the output from the dynamic content runtime environment 54 with the static content components of the requested web page 30 to generate multiple static web pages from the dynamic content embedded in the requested web page 30; and an interpreted page cache 60 that stores the multiple static web pages generated by the static page generator 56. The unfolding engine 40 may also include a user session manager 57 and a user session timeout mechanism 59.

Figure 2B:
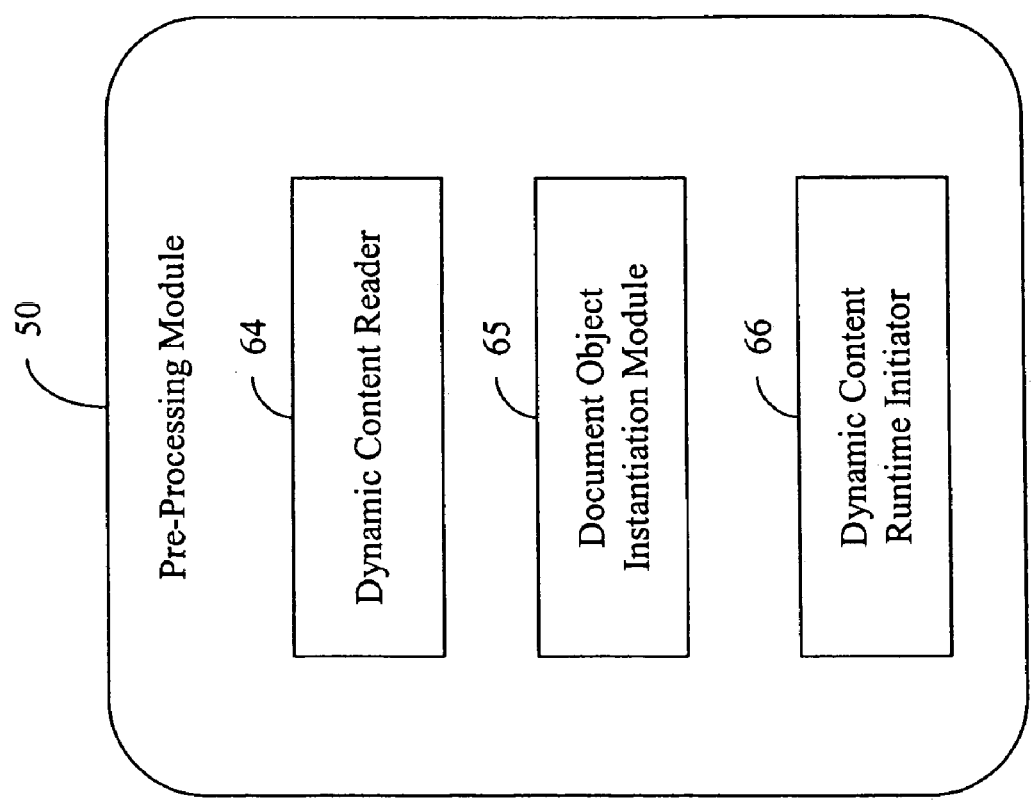
FIG. 2b is a block diagram of a pre-processing module 50 used with the unfolding engine of FIG. 2b.

FIG. 2b is a block diagram of the pre-processing module 50 used with the unfolding engine 40. The pre-processing module 50 may include a dynamic content reader 64 for reading the dynamic content in a requested web page 30; a document object instantiation module 65 that instantiates any document objects or server-side objects necessary for simulation of the dynamic content; and a dynamic content runtime initiator 66 that starts and initializes the dynamic content runtime environment 54 and passes the dynamic content from the requested web page 30 to the dynamic content runtime environment 54.

Figure 3:
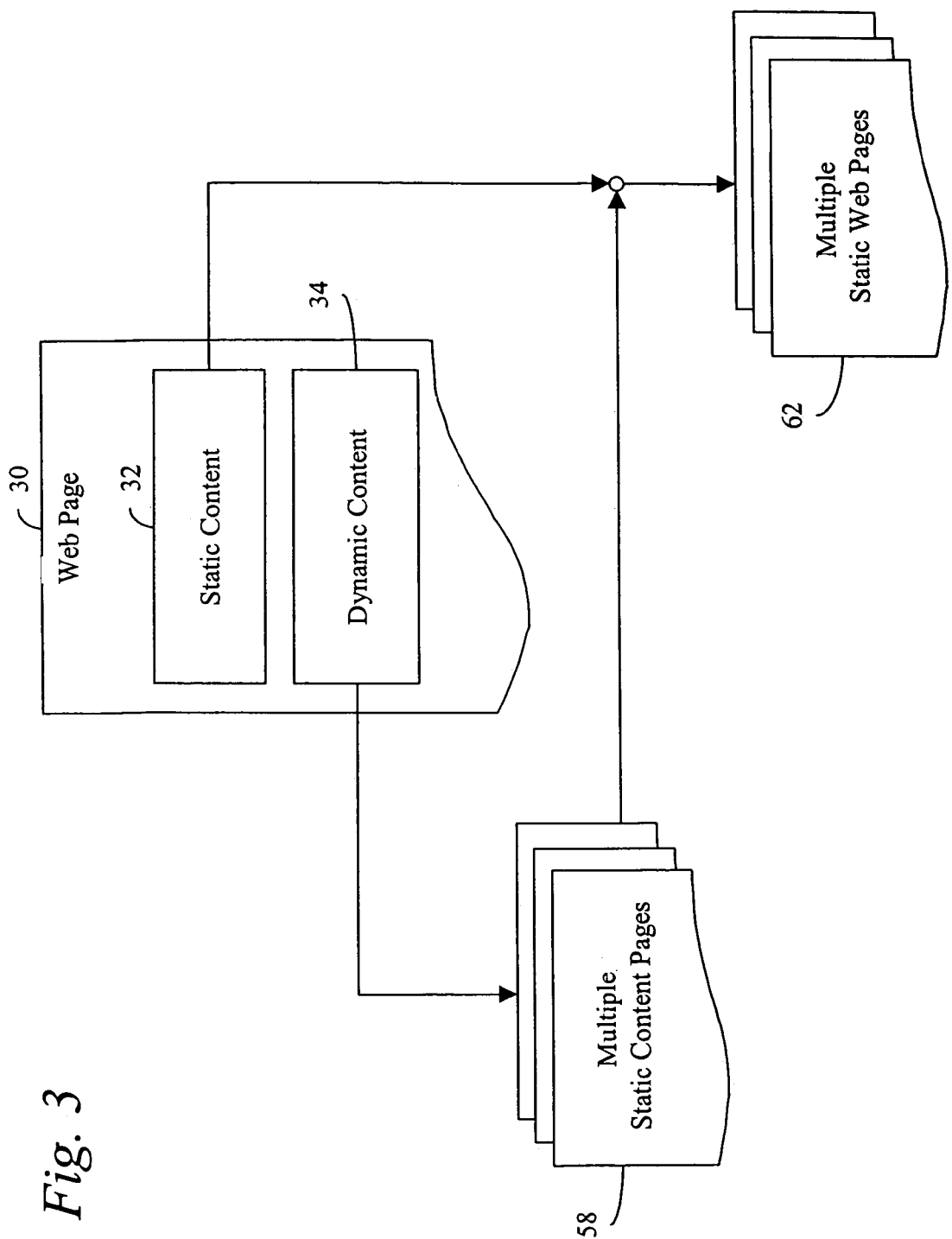
FIG. 3 is a diagram illustrating the components a web page and the resulting pages unfolded from the web page.

FIG. 3 is illustrates the components of a web page 30 and the generated content and resulting web pages unfolded from the web page 30. The web page 30 requested by the wireless device 10 and fetched by the wireless information gateway 20 may include both static content 32 and dynamic content 34. The dynamic content 34 is transformed by the unfolding engine 40 into multiple static content pages 58. Each of the multiple static content pages 58 may then be recombined with the static content 32 of the original web page 30 by the unfolding engine 40 to create the resulting multiple static web pages 62 that are stored in the interpreted page cache 60 for eventual translation and delivery to the wireless device 10.

The system 100 (see FIG. 1) operates to provide the user of the wireless device 10 with a rich, interactive information browsing experience, duplicating as much of the dynamic functionality of more robust information access devices, such as wired communication devices, as possible through the use of the unfolding engine 40 at the wireless information gateway 20 situated on the network between the wireless device 10 and the requested web page 30. When a user of the wireless device 10 initiates a request for the web page 30, the request travels over the wireless network to the wireless information gateway 20. The wireless information gateway 20 acts as a proxy for the wireless device 10, contacting the web server 35 hosting the requested web page 30 and retrieving the requested web page 30. Before forwarding the requested web page 30 on to the wireless device 10, the wireless information gateway 20 feeds the contents of the web page 30 through the unfolding engine 40 to determine if there is any interactive, dynamic content contained in the requested web page 30. Such dynamic content 34 might include any embedded scripts programmed in such scripting languages as JavaScript or VBscript, executable binary program code such as Java applets, Dynamic HTML, Cascading Style Sheets (CSS), or dynamic extensions to HTML 4.0. The unfolding engine 40 then converts the dynamic content 34 contained in the requested web page 30 into multiple static web pages 62. The multiple static web pages 62 replicate the results of any possible user interaction with the dynamic content 34. The unfolding engine 40 may then feed the multiple static web pages 62 to the wireless translator 70 for further translation into a wireless data format, such as WML for example, that may be presentable on the wireless device 10.

The unfolding engine 40 processes any dynamic content 34 in the requested web page 30 as if the dynamic content 34 were being read and processed on a standard desktop web browser programmed to handle such dynamic content 34. Examples of such desktop web browsers include Netscape® Navigator or Microsoft® Internet Explorer. In so doing, the unfolding engine 40 may follow and execute all paths and iterations of the script embedded in the web page 30, allowing for all possible results of the embedded script. The unfolding engine 40 may therefore produce a number of separate static content pages 58 derived from the requested web page 30, each static content page 58 corresponding to a different path or action resulting from an embedded script or other dynamic content 34 embedded in the requested web page 30.

In one embodiment of the system 100, the unfolding engine 40 may operate in a manner similar to the runtime environments utilized in server-side dynamic content implementations such as Java® Server Pages (JSP) and Active Server Pages (ASP). In this embodiment, the unfolding engine 40 functions similar to a web server with server-side support for dynamic content. The unfolding engine 40 separates out any static content 32 and then instantiates any server objects required for simulating the dynamic and interactive execution of the dynamic content 34 in a runtime environment.

A preferred embodiment of the unfolding engine 40, illustrated in FIG. 2a, performs the conversion of the dynamic content 34 through the interaction of several functional components that together establish and simulate a runtime environment for interpreting the dynamic content 34 and producing the multiple static content pages 58. The inspection module 52 parses the requested web page 30 to detect and separate out any dynamic content 34 for further processing. The inspection module 52 passes any dynamic content 34, such as scripts or applets, to the pre-processing module 50 for preparation for simulation. The pre-processing module 50, shown in more detail in FIG. 2*b,* reads the dynamic content 34, initiates the dynamic content runtime environment 54, and instantiates any document or server-side objects necessary for simulation of the dynamic content within the dynamic content runtime environment 54. These objects may include forms and page layers, among other document and client and server objects referenced in dynamic content contained in dynamic web pages commonly found on the Internet today. The dynamic content runtime environment 54 operates to simulate all paths through the dynamic content 34 embedded in the returned web page 30.

Known programming logic prediction techniques, including but not limited to flow and branching analysis, may be employed within the dynamic content runtime environment 54 to optimize the generation of the multiple static content pages 58 in order to enable the system 100 to present the user of the wireless device 10 with an information access experience that matches that of more robust devices as closely as possible. In so doing, the dynamic content runtime environment 54 simulates all possible user interactions and choices regarding the dynamic content 34. For example, where an embedded JavaScript provides for displaying differing content in the form of embedded text or images based upon where the user places the cursor, the dynamic content runtime environment 54 simulates document objects and actions and then prepares static content for all possible placements of the cursor. Each selectable option results in a separate generated static content page 58 which may be prepared for display on the wireless device 10.

The multiple static content pages 58 output by the dynamic content runtime environment 54 are then fed to a static page generator 56. The static page generator 56 combines each of the multiple static content pages 58, corresponding to all the possible paths through the dynamic content 34 embedded in the requested web page 30, with the static content 32 of the requested web page 30 and generates the resulting multiple static web pages 62.

The multiple static web pages 62 generated by the static page generator 56 are then stored in the interpreted page cache 60 awaiting transmission to the wireless device 10. The wireless information gateway 20 then transmits an initial interpreted static web page (not shown) to the wireless device 10 to satisfy the initial page request made by the user of the wireless device 10. As the user interacts with the initial interpreted static web page, one of the multiple static web pages 62 corresponding to the action taken by the user on the wireless device 10 is sent to the user, thereby simulating the dynamic nature of the requested web page 30. Prior to delivering the multiple static web pages 62 to the wireless device 10, the wireless translator 70 translates the static HTML code of the multiple static web pages 62 into Wireless Markup Language (WML) code for display on the wireless device 10.

In its existing role translating page requests for the wireless device 10, the wireless information gateway 20 may be required to function in a multi-user environment. In this environment, multiple wireless devices 10 may utilize the wireless information gateway 20 as a proxy to fetch web content having both static and dynamic content. In such a multi-user environment, implementation of a dynamic content unfolding engine 40 operating in a wireless information gateway 20 may raise security issues. One such concern would be the possibility of one user accessing the multiple static web pages 62 intended for, and customized to the needs and personal data of, another user. To address such concerns, in one embodiment of the system 100, a construct known in the art of programming security as a "sandbox" may be erected for each wireless device 10 user accessing the wireless information gateway 20. This sandbox construct has been implemented in runtime environments for processing dynamic web page content on desktop client computers, such as the Java® Virtual Machines running Java® applets. In addition, the dynamic content runtime environment 54 or the user session manager 57 may perform steps to ensure segregation of individual wireless device 10 user sessions in order to prevent one user from accessing data associated with another user's web content or related objects. Segregation of user sessions may be accomplished in one embodiment by mapping unique user identities to the server processes executing within the dynamic content runtime environment 54 during runtime.

The dynamic content 34 in the returned web page 30 may require access to web page component objects such as forms, images, and layers. Such component objects (or document objects) and the interactions with them have been defined and standardized by various standards bodies governing the creation, transmission, presentation and use of data on the Internet, including the World Wide Web Consortium ("W3C"). One such standard, a Document Object Model ("DOM"), governs the management of such objects. The initialization of the dynamic content runtime environment 54 by the pre-processing module 50 and the instantiation of document and server objects by the pre-processing module 50 for use in the dynamic content runtime environment 54 may, in one embodiment of the unfolding engine 40, support a web page component tree structure that is compliant with the DOM, thereby closely mirroring the operation of a standards-compliant client-side web browsing application.

Many dynamic web pages permit user interactions that may alter the web page content. As described above, the multiple static web pages 62 resulting from such a user interaction may be cached in the interpreted page cache 60. The unfolding process associated with a user session for a particular wireless device 10 may not be entirely complete, and the cached multiple static web pages 62 may not normally be released from the interpreted page cache 60 until the associated user session terminates. Abnormal termination of a user session may lead to the unnecessary storage of multiple static web pages 62 in the interpreted page 60 long after the multiple static web pages 62 are no longer needed. In one embodiment of the dynamic content unfolding engine 40, a user session timeout mechanism 59 may be implemented to ensure that the cached multiple static web pages 62 may be discarded upon an unexpected or abnormal termination of a wireless device 10 user session on the wireless information gateway 20.

FIG. 4 is a flowchart of a method 400 according to one embodiment of a dynamic content unfolding engine in a wireless information gateway. The method 400 initiates when the wireless information gateway 20 intercepts a request for a web page made by the wireless device 10 (step 410). If the wireless information gateway 20 determines that the page being requested by the wireless device 10 is already one of the multiple static web pages 62 stored in the interpreted page cache 60, and therefore is merely a page corresponding to some action taken on a dynamic web page 30 already interpreted and delivered to the wireless device 10, then the method 400 proceeds to the steps of translating (step 490) and transmitting (step 495) the page requested to the wireless device 10. If, however, the requested web page 30 is not already stored in the interpreted page cache 60, then the wireless information gateway 20 fetches the requested web page 30 from the appropriate web server 35 and unfolds the requested web page 30 into multiple static web pages 62 stored in an interpreted page cache 60 (step 420). Following the fetching and unfolding step 420, the method 400 proceeds by passing, as needed, each of the multiple static web pages 62 to the wireless translator 70 which translates the static HTML code of the multiple static web pages 62 into the Wireless Markup Language (WML) code for display on the wireless device 10 (step 490). The translated multiple static web page 62 appropriate to any action taken on the dynamic content 34 at the requesting wireless device 10 is then selected and delivered to the wireless device 10 (step 495).

Figure 5B:
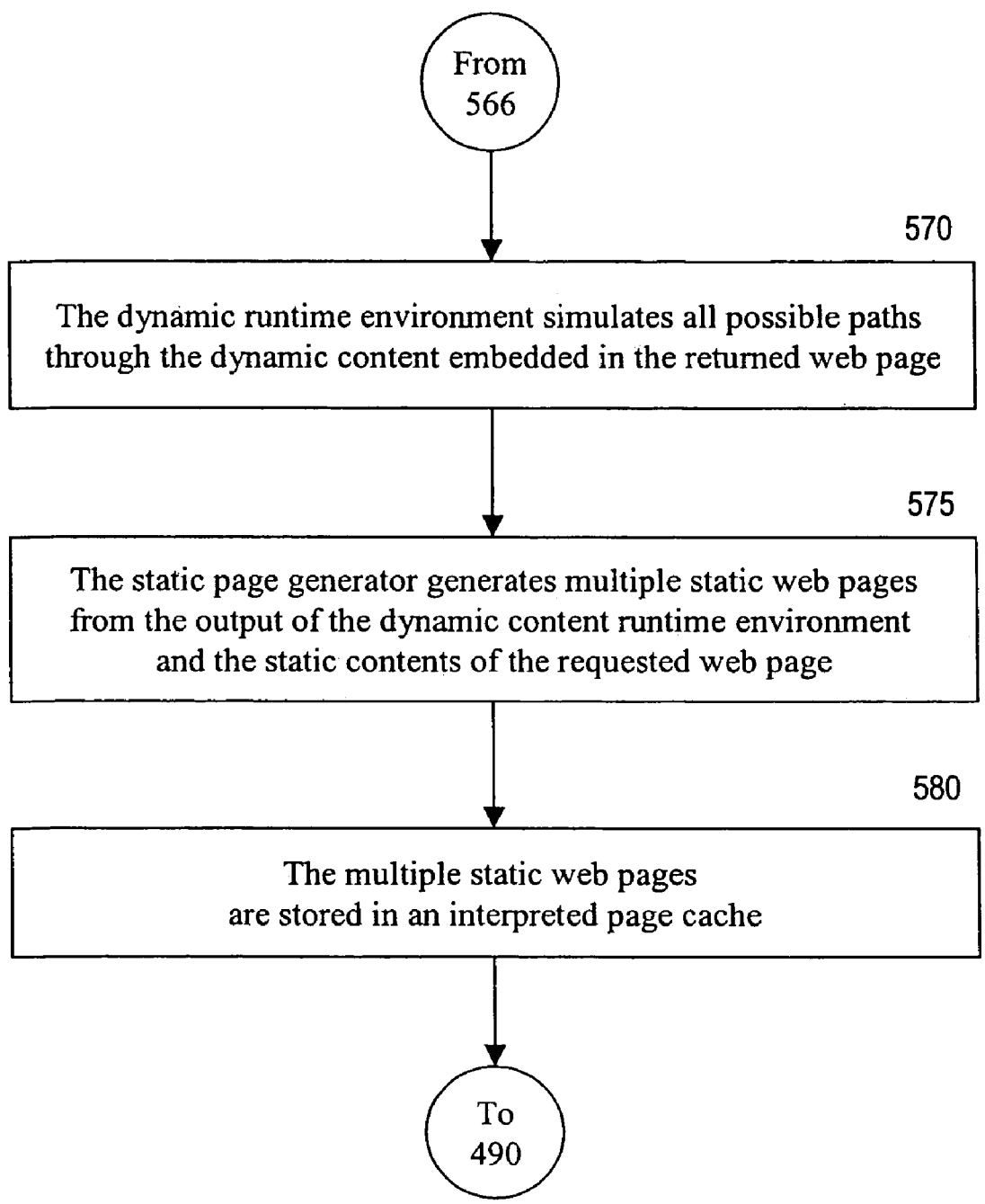

FIGS. 5a and 5b illustrate the fetching and unfolding step 420 of the method 400. The step 420 initiates when the wireless information gateway 20 forwards the request from the wireless device 10 on to an appropriate web server 35 hosting the requested web page 30 (step 530) and the web server 35 returns the requested web page 30 to the wireless information gateway 20 (step 540). In the wireless information gateway 20, the unfolding engine 40 takes over handling of the requested web page 30. The inspection module 52 parses the returned web page 30 to detect any dynamic content 34, in the form of scripts, applets, or other dynamic content (step 550). The pre-processing module 50 then separates out any static content 32 and reads the dynamic content 34 embedded in the returned web page (step 560), and instantiates any document and server objects necessary to unfold the dynamic content (step 564). The pre-processing module 50 initiates a dynamic content runtime environment 54 and passes the dynamic content 34 from the requested web page 30 to the dynamic content runtime environment 54 for unfolding (step 566). The dynamic runtime environment 54 then simulates all possible paths through the dynamic content 34 embedded in the returned web page 30 and generates resulting multiple static content pages 58 for each possible path (step 570). The simulation step 570 may be performed through multiple iterations of the script or other dynamic content 34 embedded in the returned web page 30. The static page generator 56 then generates multiple static web pages 62 from the output multiple static content pages 58 of the dynamic content runtime environment 54, combined with the static content 32 of the requested web page 30 (step 575). The generated multiple static web pages 62 are then stored in the interpreted page cache 60 (step 580).

The steps of the method 400 may be implemented with hardware or by execution of programs, modules or scripts. The programs, modules or scripts may be stored or embodied on one or more computer readable mediums in a variety of formats, including source code, object code or executable code, among other formats. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. An apparatus for unfolding dynamic world wide web content on a wireless information gateway for presentation on wireless devices, the apparatus comprising:
   an unfolding engine that converts dynamic web content to static web pages, wherein the unfolding engine comprises:
      an inspection module that detects and separates dynamic content from static content in web pages requested by the wireless devices;
      a dynamic content runtime environment that simulates interactive execution of dynamic content;
      a pre-processing module that prepares dynamic content for simulated interactive execution in the dynamic content runtime environment wherein the pre-processing module comprises:
         a dynamic content reader that reads the dynamic content;
         a document object instantiation module to instantiate document and server-side objects necessary for simulation of the dynamic content; and
         a dynamic content runtime initiator that starts and initializes the dynamic content runtime environment and passes the dynamic content to the dynamic content runtime environment;
      a static page generator that generates static pages from the output of the dynamic content runtime environment;
      an interpreted page cache that stores the static pages generated by the static page generator; and
      a wireless markup language translator module that translates static web content to a format suitable for display by wireless devices.

2. The apparatus of claim 1, wherein the document and sewer-side objects necessary for simulation of the dynamic content conform to an industry-standard Document Object Model.

3. An apparatus for unfolding dynamic world wide web content on a wireless information gateway for presentation on wireless devices, the apparatus comprising:
   an unfolding engine that converts dynamic web content to static web pages, wherein the unfolding engine comprises:
      an inspection module that detects and separates dynamic content from static content in web pages requested by the wireless devices;
      a dynamic content runtime environment that simulates interactive execution of dynamic content;
      a pre-processing module that prepares dynamic content for simulated interactive execution in the dynamic content runtime environment;
      a static page generator that generates static pages from the output of the dynamic content runtime environment;
      an interpreted page cache that stores the static pages generated by the static page generator;

a user session manager that manages multiple wireless device user sessions and segregates and tracks the multiple static web pages generated by each of the multiple wireless device user sessions; and a wireless markup language translator module that translates static web content to a format suitable for display by wireless devices.

4. The apparatus of claim 3, wherein the interpreted page cache further comprises a user session timeout mechanism to permit discarding the multiple static web pages generated by one of the multiple wireless device user sessions upon the timeout of said user session.

5. A method for unfolding dynamic world wide web content on a wireless information gateway for presentation on wireless devices, the method comprising the steps of:

intercepting a request for a web page from a wireless device further comprising assigning a unique user session identifier to the page request from a specific wireless device and all subsequently fetched web pages and resulting multiple static web pages associated with the page request and specific wireless device;

determining if the requested web page is already stored in an interpreted page cache;

fetching the requested web page from an appropriate web server;

reading the returned web page in a unfolding engine on the wireless information gateway to detect and separate any dynamic content embedded in the returned web page;

unfolding any dynamic content embedded in the returned web page into multiple static content pages by simulating all possible paths through the dynamic content in a dynamic content runtime environment and preparing dynamic content for simulated interactive execution in the dynamic content runtime environment;

generating multiple static web pages from the output of the dynamic content runtime environment;

storing the multiple static web pages in the interpreted page cache; and delivering from the interpreted page cache to the wireless device one of the stored multiple static web pages appropriate to each action taken on the dynamic content at the requesting wireless device.

6. The method of claim 5, wherein the storing step further comprises: segregating the multiple static web pages associated with a user session identifier from the multiple static web pages associated with other user session identifiers, ensuring privacy of content and user data; and discarding all stored multiple static web pages associated with a specific user session identifier if the user session associated with the specific user session identifier has terminated or otherwise exceeded a defined inactivity period.

7. A computer readable medium upon which is embedded instructions for carrying out a method for unfolding dynamic world wide web content on a wireless information gateway for presentation on wireless devices, the method comprising the steps of:

intercepting a request for a web page from a wireless device further comprising assigning a unique user session identifier to the page request from a specific wireless device and all subsequently fetched web pages and resulting multiple static web pages associated with the page request and specific wireless device;

determining if the requested web page is already stored in an interpreted page cache;

fetching the requested web page from an appropriate web server;

reading the returned web page in a unfolding engine on the wireless information gateway to detect and separate any dynamic content embedded in the returned web page;

unfolding any dynamic content embedded in the returned web page into multiple static content pages by simulating all possible paths through the dynamic content in a dynamic content runtime environment and preparing dynamic content for simulated interactive execution in the dynamic content runtime environment;

generating multiple static web pages from the output of the dynamic content runtime environment;

storing the multiple static web pages in the interpreted page cache; and delivering from the interpreted page cache to the wireless device one of the stored multiple static web pages appropriate to each action taken on the dynamic content at the requesting wireless device.

8. The computer readable medium of claim 7, wherein the storing step further comprises: segregating the multiple static web pages associated with a user session identifier from the multiple static web pages associated with other user session identifiers, ensuring privacy of content and user data; and discarding all stored multiple static web pages associated with a specific user session identifier if the user session associated with the specific user session identifier has terminated or otherwise exceeded a defined inactivity period.

* * * * *